(12) United States Patent
Gressier et al.

(10) Patent No.: US 7,608,953 B2
(45) Date of Patent: Oct. 27, 2009

(54) ALTERNATOR PROVIDED WITH IMPROVED MEANS FOR REMOVING ELECTROSTATIC CHARGERS

(75) Inventors: Vincent Gressier, La Calotterie (FR); François Millon, Boulogne sur Mer (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 602 days.

(21) Appl. No.: 10/565,673

(22) PCT Filed: Jul. 26, 2004

(86) PCT No.: PCT/FR2004/001994

§ 371 (c)(1),
(2), (4) Date: May 9, 2006

(87) PCT Pub. No.: WO2005/015711

PCT Pub. Date: Feb. 17, 2005

(65) Prior Publication Data

US 2006/0238041 A1 Oct. 26, 2006

(30) Foreign Application Priority Data

Jul. 31, 2003 (FR) .................................. 03 09431

(51) Int. Cl.
*H02K 11/00* (2006.01)

(52) U.S. Cl. .......................................... 310/89; 310/71
(58) Field of Classification Search .................... 310/90, 310/89, 68 D, 71
See application file for complete search history.

(56) References Cited

U.S. PATENT DOCUMENTS

| 4,873,512 A | 10/1989 | Miller |
| 5,296,770 A * | 3/1994 | Pflueger et al. ................ 310/14 |
| 5,804,903 A | 9/1998 | Fisher et al. |
| 6,984,906 B1 * | 1/2006 | Martiny, Jr. ................... 310/90 |

FOREIGN PATENT DOCUMENTS

| DE | 10158963 | 6/2003 |
| EP | 0 240 644 A1 | 10/1987 |
| FR | 2 807 889 | 10/2001 |
| FR | 2 855 674 A1 | 12/2004 |
| WO | WO 97/01200 | 1/1997 |

* cited by examiner

*Primary Examiner*—Dang D Le
(74) *Attorney, Agent, or Firm*—Berenato, White & Stavish, LLC

(57) ABSTRACT

The invention relates to an alternator including at least one concentration peak (80) for the accumulation of electric charges (90) which is formed on the external face (19) of a ease bearing stator and extending in relief in a direction of the part (84) of a flexible belt driving element (80) in such a way that electrostatic charges are removed by electric arcs formed between the peak (80) and the part (84).

8 Claims, 5 Drawing Sheets

US 7,608,953 B2

ALTERNATOR PROVIDED WITH IMPROVED MEANS FOR REMOVING ELECTROSTATIC CHARGERS

FIELD OF THE INVENTION

The present invention concerns a motor vehicle alternator.

BACKGROUND OF THE INVENTION

The invention concerns more particularly an alternator of the type described and depicted in the document FR-A-2.807.889, which comprises means tending to eliminate static electricity.

This document proposes in particular a motor vehicle alternator of the type comprising:
- a casing carrying a stator;
- a rotor whose central shaft is mounted for rotation in the stator and consists of a so-called magnetic part comprising in particular at least the rotor shaft and pole pieces, and at least one induction winding;
- and means aimed at eliminating the electrostatic charges on the alternator, by providing a permanent resistive electrical connection between the magnetic part of the rotor and its winding.

Still for promoting the discharge of electrostatic charges, it was proposed in the French Patent Application No 03.06553 of 30 May 2003 to provide a permanent electrical connection between the rotor shaft and the case which carries the stator, with its lateral plates, and therefore with the electrical earth of the vehicle. This is because the stator proper and its casing which carries it are connected to the electrical earth of the vehicle. As described in the document EP240644, a stator can be mounted in the casing by means of a damping element such as rubber. In this case, the electrical potentials of the casing and stator may be different, the potential of the casing being however connected to the vehicle earth.

To this end, a metallic pulley which is fixed to the shaft with which it is in permanent electrical connection through its internal bore is electrically connected permanently to the lateral plate.

This connection is provided by a conductive wiper carried by the rear plate and which rubs permanently on a facing portion of the front lateral face of the pulley and/or the belt.

By way of variant of this design, as the wiper is a part liable to wear, it may belong to the belt itself and rub on the external lateral face of the rear plate.

These designs also make it possible to discharge the electrical charges which form on the belt because of the high-speed rubbing of the belt on the various pulleys which it runs over and the charges that it collects on this occasion.

The invention aims to propose means that are simple to implement for providing this electrical connection without suffering the various drawbacks related to permanent rubbing.

SUMMARY OF THE INVENTION

To this end, the invention proposes a motor vehicle alternator of the type comprising:
- a casing carrying a stator;
- a rotor whose central shaft is mounted for rotation in the stator, a rear axial end of the rotor shaft which extends axially outside the stator, carrying a pulley driving in rotation the shaft driven in rotation by a flexible driving element, in particular a belt or a chain;
- and means aimed at eliminating the electrostatic charges on the alternator, wherein that the said means provide a contactless electrical connection on a controlled path between on the one hand the casing that carries the stator and on the other hand the pulley and/or flexible driving element.

Thus the controlled discharge path is situated outside the alternator.

According to other characteristics of the invention:
- these means comprise at least one concentration peak for the electrical charges which is formed on an external face of the casing and which extends in relief in the direction of a facing portion of the pulley and/or the flexible driving element so as to eliminate the electrostatic charges by the formation of electric arcs between the peak and the said portion;
- the said means comprise a series of concentration peaks for the electrical charges;
- the peaks in the said series are adjacent in order to constitute a collar projecting radially and/or axially, comprising a peripheral end edge free from any sharp profile;
- at least one peak is produced in one piece with the corresponding part of the casing;
- at least one peak extends axially from an external transverse lateral face portion of the casing;
- at least one peak extends radially from an external transverse lateral face portion of the casing;
- at least one peak extends opposite a facing portion of the transverse lateral face of the flexible drive elements;
- at least one peak extends opposite a facing portion of a transverse lateral face of the pulley;
- at least one peak extends opposite a facing portion of the cylindrical lateral face of the pulley.

BRIEF DESCRIPTION OF THE DRAWINGS

Other characteristics and advantages of the invention will emerge from a reading of the following detailed description, for understanding of which reference will be made to the accompanying drawings, in which.

DESCRIPTION OF PREFERRED EMBODIMENTS

In the following description, a front-rear orientation from left to right as seen in the figures will be adopted non-limitingly.

Figure 1:
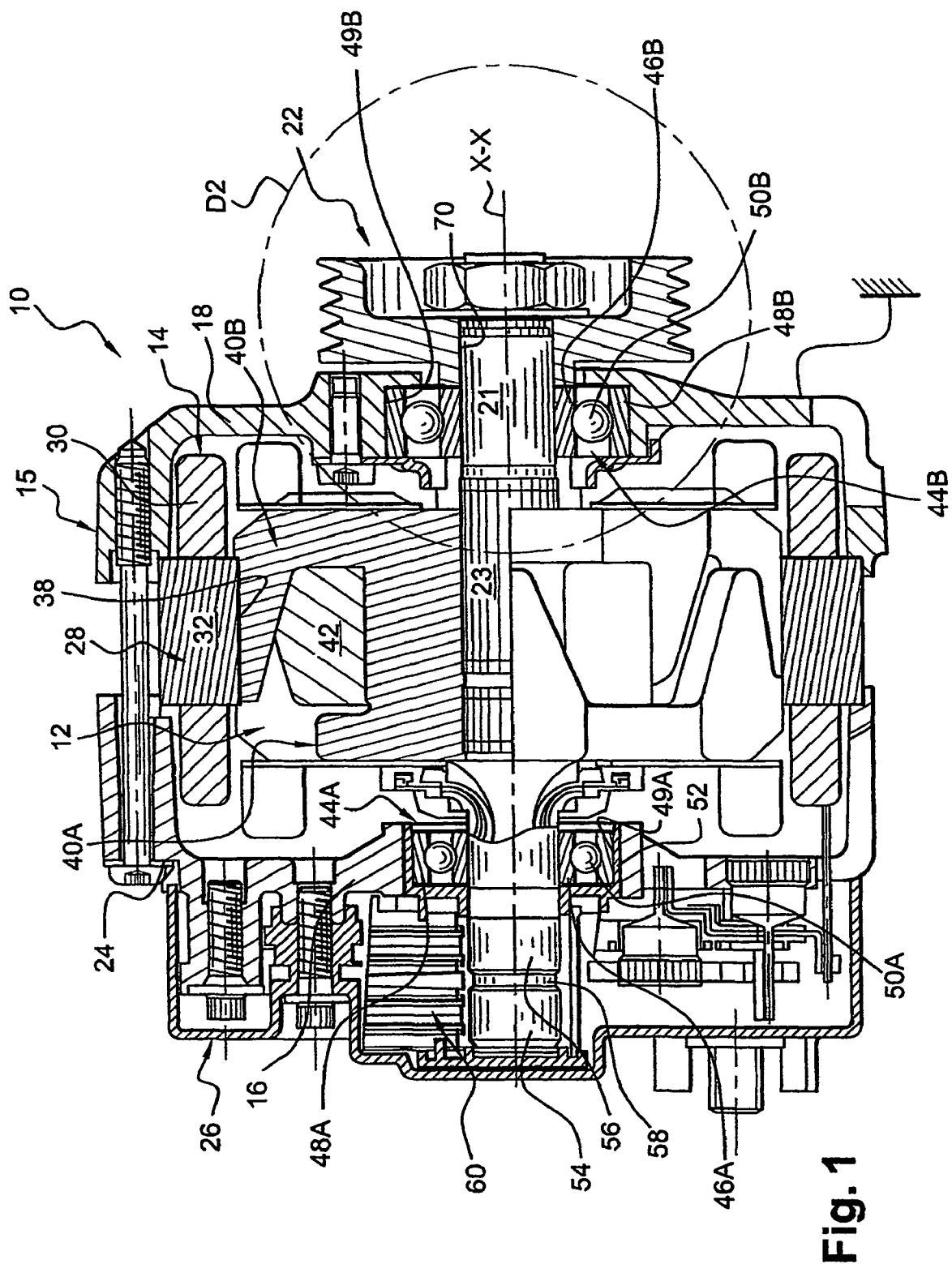
FIG. 1 is a view in partial axial section of an alternator according to the prior art.

FIG. 1 depicts an alternator 10 which comprises essentially a rotor 12 driven in rotation about its axis X-X inside a substantially annular stator 14 itself fixed inside a substantially cylindrical casing 15 of the alternator 10, here of the type described and depicted in the document EP-A0.515.259, to the content of which reference can be made for more details and information.

The casing 15 is closed at its two axial ends by front 16 and rear 18 transverse plates through which a shaft 21 of the rotor is mounted for rotation. The shaft 21 and the plates 16 and 18 are made from electrically conductive material, in particular metal.

At its rear axial end, the shaft 21, which projects outside the rear transverse plate 18, carries a metallic pulley 22 which is intended to receive a belt (not shown in FIG. 1) for rotationally driving the rotor 12. In a variant which is not shown, the belt is replaced by a flexible transmission chain.

On an external face 24 of the front opposite transverse plate or bearing 16, a protective cover 26 covers means of regulating and shaping the electric current produced by the alternator, which in particular comprise a bridge rectifier (here with diodes, not referenced in FIG. 1), a voltage regulator and terminals for connection to an electrical circuit of the vehicle.

In a known manner, the stator 14 comprises a body 32 produced in the form of a packet of metal sheets 28, which extends substantially radially and each of which is provided with notches for the passage of windings or coils of conductive wires 30 which form the armature of the alternator. In a variant, not shown, the wound conductive wires are replaced by conductors in the shape of a hairpin.

The stator body 32 comprises a perfectly cylindrical internal cylindrical surface 38 which delimits a space inside which the rotor 12 is mounted for rotation.

The rotor 12 with claws consists essentially of two identical pole wheels 40A, 40B which are mounted on the central fluted part 23 of the shaft 21 of the rotor 12, for driving in rotation thereof, and a coil or winding 42 arranged between the metal pole wheels 40A, 40B each carrying an internal fan for cooling the alternator.

The rotor shaft 21 is mounted for rotation in the plates 16 and 18 by means of a front ball bearing 44A and a rear ball bearing 44B, which each comprise an internal bearing race 46A, 46B and an external bearing race 48A, 48B with the interposing of balls 50A, 50B respectively.

Each component of a bearing is produced from electrically conductive metal.

Each internal race 46A, 46B is in intimate contact with the convex cylindrical surface of the shaft 21 of the rotor 12, with which it is also in electrical contact.

As illustrated in FIG. 1, the external race 48B of the rear bearing 44B is mounted directly in a corresponding housing 49B in the rear metallic plate 18, with which it is also in electrical contact.

On the other hand, the external race 48A of the front bearing 44A is mounted in a corresponding housing 49A in the front plate 16 with the interposing of a vibration damping race 52, which is generally made from electrically insulating plastics material.

In a known manner, the front axial end of the shaft 21 carries two collector rings, front 54 and rear 56, which are adjacent and separated by an axial space in the form of a separation groove 58.

Each of the collector rings 54 and 56 is electrically conductive and is designed to cooperate with associated brushes of a brush holder 60 housed in the cover 26. The collector rings are connected, by cabled connections, not shown, to the ends of the winding 42.

The front ring 54 is traditionally at so-called "zero" potential, that is to say substantially at the potential of the electrical earth of the vehicle to which in particular the stator is connected by the means of fixing the alternator to the metal structure (not shown) of the vehicle.

The rear ring 56 adjacent to the front bearing 44A is at the potential of the winding or coil of the rotor 42, which is for example around 14 volts.

In order to assist the discharge of the electrostatic charges, it is desirable to provide an electrical connection between the shaft 21 of the rotor 12 and the casing with its lateral plates, and therefore with the electrical earth of the vehicle.

The metal pulley 22 is fixed to the shaft 21, with which it is in permanent electrical connection through its internal bore 70.

Figure 2:
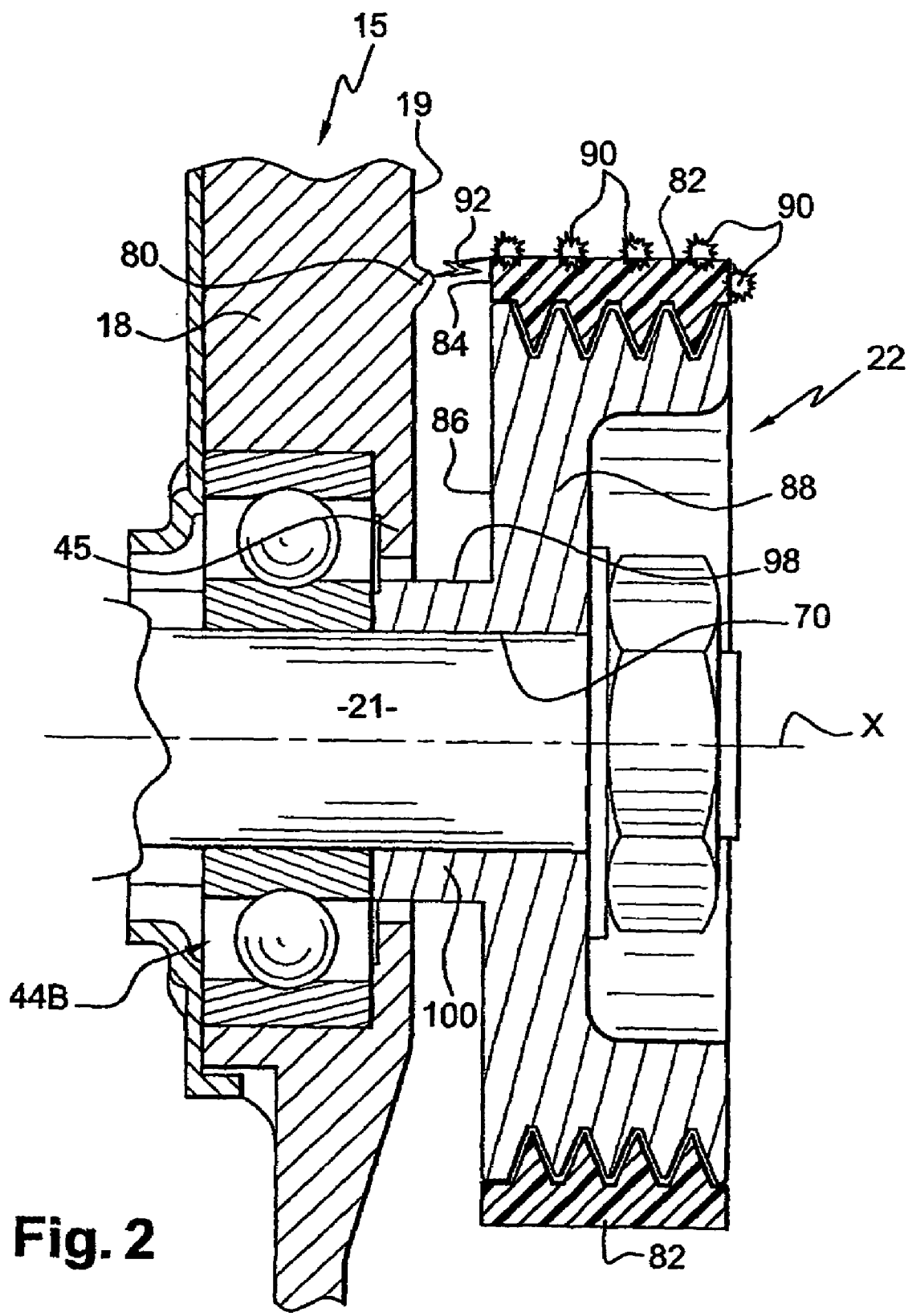
FIG. 2 is a view to a large scale of the detail D2 in the figure which illustrates schematically a first preferred embodiment of the invention.

As can be seen in FIG. 2, and in accordance with the teachings of the invention, the lateral face 19 of the rear plate 18 of the casing 15 which carries the stator 14 comprises here a spike or peak in relief which extends axially towards the rear in the direction of the belt 82, which here has schematically a grooved rectangular cross-section with its front transverse lateral face or edge 84 extending in the same plane as the front lateral face 86 of the plate 88 of the pulley 22.

The electrical charges 90 which accumulate on the assembly consisting of the pulley 22 and the belt 82 have been depicted schematically by "sparks".

When a sufficient voltage threshold is reached, referred to as the breakdown voltage, an electric arc 92 is formed, represented by a flash between the edge 84 of the belt 82 and the peak 80, the electrical discharge path thus being oriented in a predetermined fashion in the direction of the plate, which is connected to the electrical earth of the vehicle.

This oriented and favoured electrical discharge, or "spike" effect, stems from the fact that the electrical field is stronger in the vicinity of a charged conductive spike (or peak). All the ionisation phenomena (ionisation due to an intense electrical field) are therefore greater in the vicinity of a spike. This is due to the fact that the potential varies as $1/r$ whereas the electrical field varies as $1/r^2$.

Let there be two balls of radii "r" and "R"=2r raised to the same potential. Since the two balls are at the same potential, this means that on the large ball (R) there are twice as many charges as on the small ball "r", the potential varying inversely as the radius of the ball.

However, the surface or surface area, of the "large" ball is not twice as great but four times greater than that of the "small" ball. The surface density of charges is twice as great on the small ball.

This does not explain why the field is greater in the vicinity of the small ball. This is because on the small ball the charge is q and on the large ball is Q=2q.

If the field is measured at two points, each distant by R from the centre of each of the two balls, the field is stronger in the vicinity of the large ball. This is because in one case the value of the field is equal to Kq/R for the small ball and is equal to 2Kq/R for the large ball.

Consequently, at equal distances, the electrical field of the small ball is twice as small.

On the other hand, it is possible to "approach" as close as possible to the centre of the small ball, which is not possible with a large ball, since its radius is R.

Therefore, as it is possible to approach twice as close to the centre of the small ball as that of the large ball, the field should be four times stronger (since the field varies as $1/r^2$ and one is twice as close).

In summary, because there are half the charges, the field should be half as strong. Moreover, because the surface of the small ball is twice as close to its centre, the field should be four times stronger there. Finally, the field is only twice as strong on the surface of the small ball.

Because of the magnitude of the electrical field in the vicinity of a spike, the air ionises more easily. The air is therefore a better conductor of electricity in the vicinity of a charged spike than in the vicinity of a charged surface with a larger radius of curvature. This is the reason why lightning or an electrical discharge arc for preference strikes a spike or peak.

By analogy, it is the pulley 22 and/or the belt 82 which constitutes the "large ball" and a protrusion in the form of a peak 80 or the like constitutes the "small ball".

Naturally it is possible to provide several peaks which are for example arranged in an arc of a circle centred around the axis X-X.

The peaks or spikes 80 make it possible to obtain a concentration of the electrical charges and determine very short and much less resistive leakage paths than for example between the shaft and a collector, or between the shaft and an external bearing cage.

The electrical charges pass through neither the rotor nor the bearings, thus preventing any risk, in particular of damage or internal electrical overloads.

When the peaks 80 are produced directly by casting with the rear plate, the implementation of the invention is obtained at zero cost, that is to say without any additional labour component, simply by making minor modifications to the casting process. In a variant the peaks 80 can consist of attached metal pieces fixed for example by screwing to the rear plate. It is also possible to have a combination of peaks 80 issuing from a casting and attached peaks, each of these peaks being able to extend either axially or radially as described below.

Without departing from the scope of the invention and by way of a non-illustrated variant of this embodiment, the belt 82 (or the flexible transmission element standing in for it) may comprise in its front lateral edge 84 peaks or protrusions similar to the peaks 80 from which the electrical discharge arcs are formed in the direction of the peaks 80 on the plate, thus even further promoting the "guidance" of the electrical discharges as the belt passes in front of the peaks 80.

By virtue of the first embodiment that has just been described, the spikes or peaks 80 which are situated facing the front transverse lateral edge 84 of the belt allow a discharge of the electrical charges accumulated at the belt, before they reach the pulley proper and its magnetic part formed by the rotor assembly.

Figure 3:
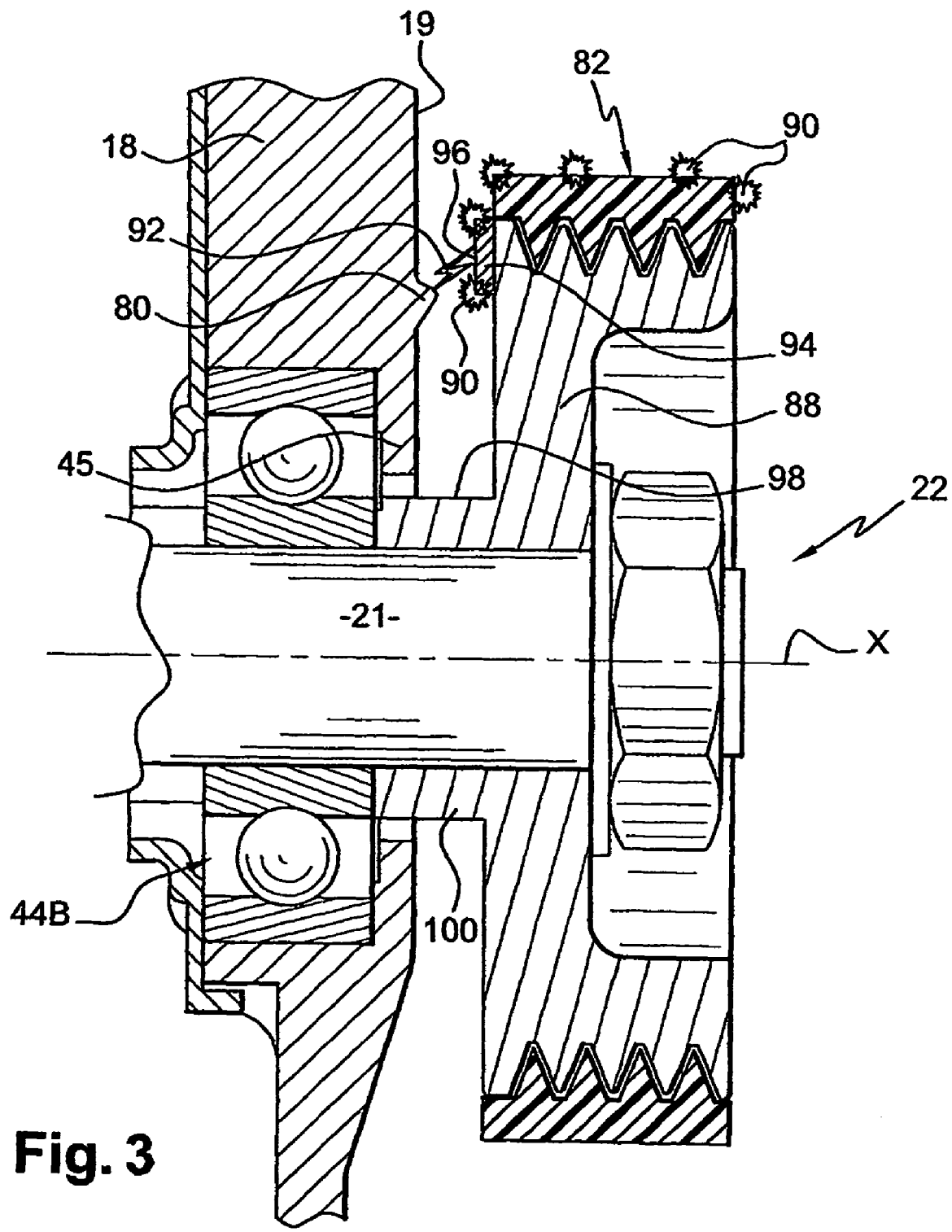
FIG. 3 is a schematic view similar to that of FIG. 2 which illustrates a second embodiment of the invention.

According to the second embodiment illustrated in FIG. 3, the peaks 80 are arranged opposite the front lateral face 86 of the pulley 22 and more precisely opposite an annular lateral face portion 94 belonging to a protrusion 96 which makes it possible to control the phenomenon with precision, and in particular the distance between the peaks and the pulley, which is for example around 0.5 mm, this value being in particular less than the distance, around 2-3 mm, between the collector ring and the shaft.

The surface density of charges is locally reinforced on the pulley, the electrical field is locally greater, the air ionises more and becomes more conductive and the efficacy of the principle according to the invention is further improved.

Figure 4:
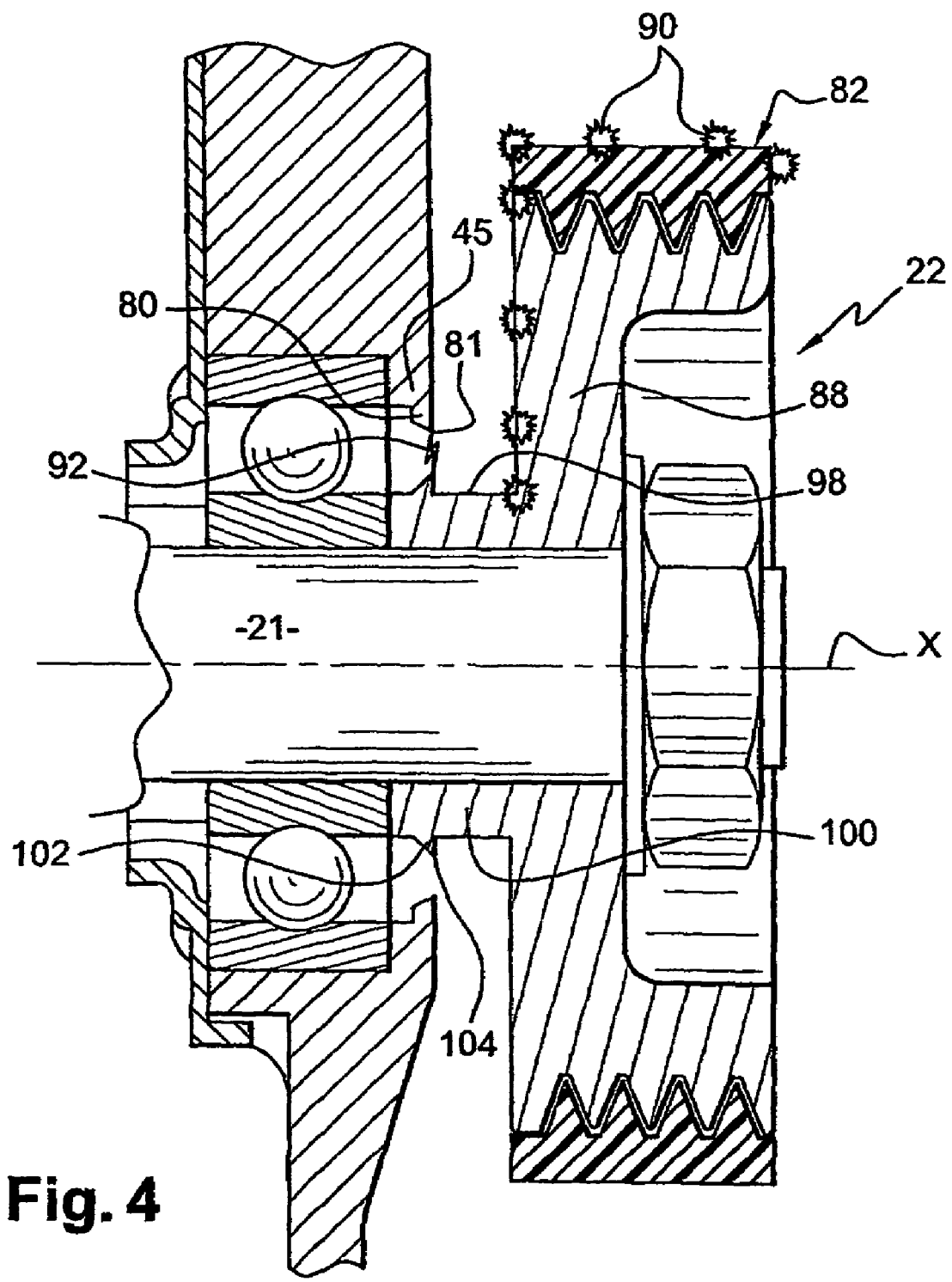
FIG. 4 is a schematic view similar to that of FIG. 2 which illustrates a third embodiment of the invention.

According to the third embodiment illustrated in FIG. 4 the peaks and protrusions 80 extend radially towards the inside in the direction of the external convex cylindrical lateral surface 93 of a front tubular axial sleeve 100 of the hub of the pulley 22.

The spikes 80 can be distributed angularly in an even manner or consist of a continuous internal radial collar corresponding to a multiplicity of adjacent peaks, and the sharp internal radial edge 81 of which constitutes a continuous spike or peak edge.

In order further to control the phenomenon, the sleeve 100 can comprise an external radial collar 102, the sharp external radial edge 104 of which extends opposite the spikes 80 or the edge 81 of the continuous collar 80.

Figure 5:
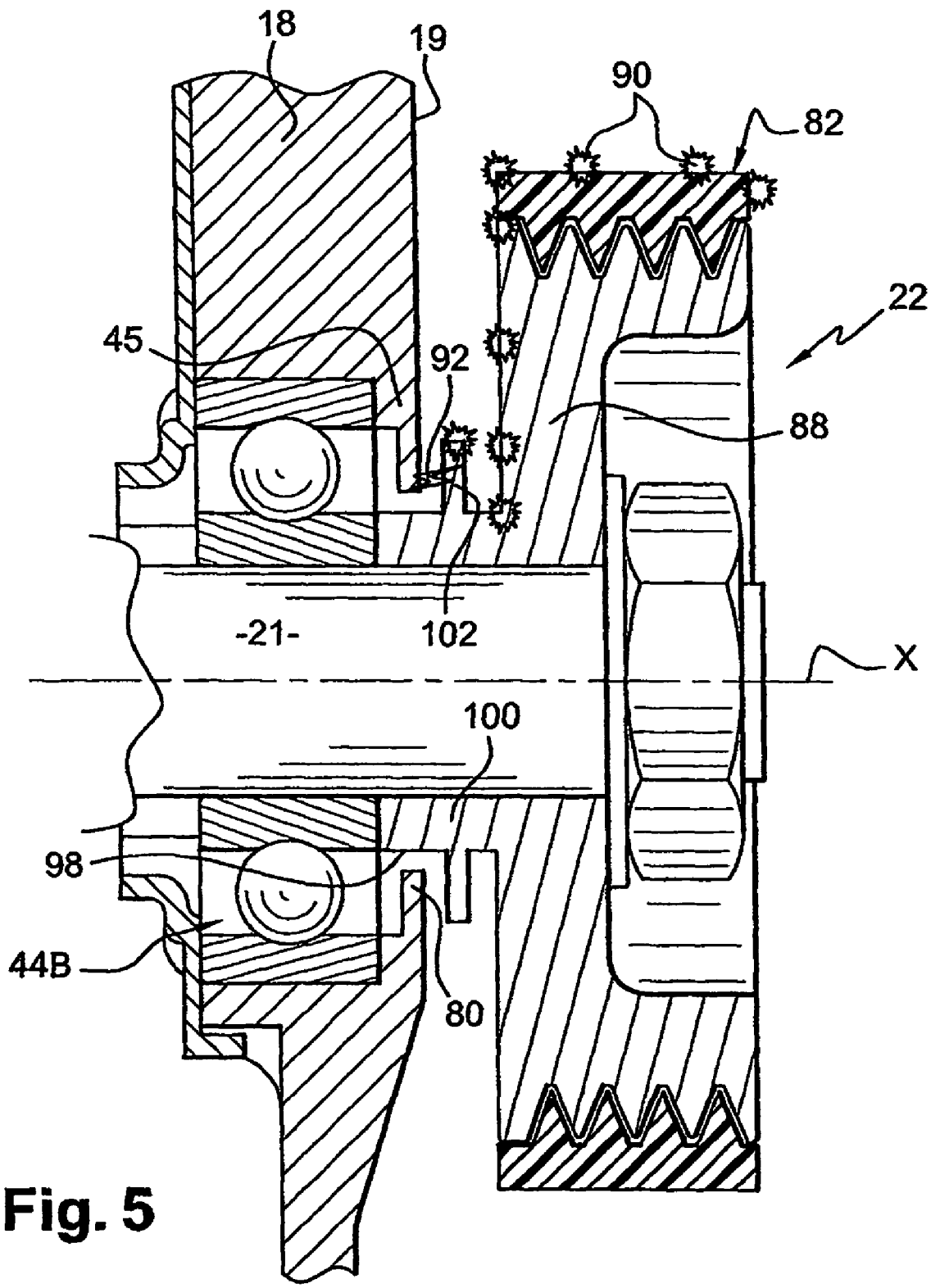
FIG. 5 is a schematic view similar to that of FIG. 2 which illustrates a fourth embodiment of the invention.

Finally, according to the fourth embodiment depicted in FIG. 5, the collar 102, attached or produced by machining with the sleeve 100, can extend opposite the spikes or peaks 80 but be offset axially with respect to the radial plane of the spikes 80. The latter can also once again be an annular collar holding the bearing 44B in its housing, such as the collar 45 in FIG. 2.

The collar can be produced in one piece with the plate attached to it, but this is then considered to be a part of the stator within the meaning of the invention.

The various embodiments and variants can of course be combined without departing from the scope of the invention. Naturally the alternator is reversible and makes it possible to start the thermal engine of the vehicle.

What is claimed is:

1. A motor vehicle alternator comprising:
   a casing carrying a stator, the electrical potential of which is connected to a vehicle earth;
   a rotor whose central shaft is mounted for rotation in the stator, a rear axial end of the rotor shaft which extends axially outside the stator, carrying a pulley for rotationally driving the shaft driven in rotation by a flexible driving element; and,
   a contactless electrical connection on a controlled external path between the casing and the flexible driving element for eliminating electrostatic charges on the alternator, said contactless electrical connection including at least one concentration peak for the electrical charges which is formed on an external face of the casing, and which extends in relief in the direction of a facing portion of the pulley.

2. Alternator according to claim 1, wherein said contactless path further comprises a series of concentration peaks for the electrical charges.

3. Alternator according to claim 2, wherein the peaks in said series are adjacent in order to constitute a collar projecting axially, comprising a peripheral end edge free from any sharp profile.

4. Alternator according to claim 1, wherein said at least one peak is produced in one piece with the corresponding part of the casing.

5. Alternator according to claim 1, wherein said at least one peak extends axially from an external transverse lateral face portion of the casing.

6. Alternator according to claim 1, wherein said at least one peak extends radially from an external transverse lateral face portion of the casing.

7. Alternator according to claim 1, wherein said at least one peak extends opposite a facing portion of a transverse lateral face of the flexible drive element.

8. Alternator according to claim 1, wherein said at least one peak extends opposite a facing portion of a transverse lateral face of the pulley.

* * * * *